United States Patent [19]
Cote et al.

[11] Patent Number: 5,938,729
[45] Date of Patent: Aug. 17, 1999

[54] SYSTEM AND METHOD FOR MONITORING SERVER PERFORMANCE AT A CLIENT COMPUTER

[75] Inventors: Joseph Paul-Emile Pierre Cote, Issaquah; Stephen David Thomas, Bellevue, both of Wash.

[73] Assignee: Microsoft Corporation, Redmond, Wash.

[21] Appl. No.: 08/682,832

[22] Filed: Jul. 12, 1996

[51] Int. Cl.[6] ............................ G06F 13/14; G06F 15/16
[52] U.S. Cl. ......................... 709/224; 709/219; 710/220
[58] Field of Search ........................ 395/200.53, 200.54, 395/200.55, 200.56, 200.57, 200.58; 707/101; 709/223, 224, 225, 226, 227, 228, 219; 710/5, 220

[56] References Cited

U.S. PATENT DOCUMENTS

| | | | |
|---|---|---|---|
| 5,218,699 | 6/1993 | Brandle et al. .......................... 395/650 |
| 5,230,051 | 7/1993 | Quan ....................................... 395/700 |
| 5,247,676 | 9/1993 | Ozur et al. .............................. 395/650 |
| 5,283,856 | 2/1994 | Gross et al. .............................. 395/51 |
| 5,414,858 | 5/1995 | Hoffman et al. ....................... 395/725 |
| 5,491,791 | 2/1996 | Glowny et al. ..................... 395/183.13 |
| 5,506,955 | 4/1996 | Chen et al. ......................... 395/183.02 |
| 5,619,656 | 4/1997 | Graf ................................... 395/200.11 |
| 5,631,949 | 5/1997 | Milton et al. ............................. 379/67 |
| 5,684,945 | 11/1997 | Chen et al. ......................... 395/182.18 |
| 5,696,486 | 12/1997 | Poliquin et al. ................... 395/183.01 |
| 5,748,896 | 5/1998 | Daly et al. ......................... 395/200.53 |
| 5,802,303 | 9/1998 | Yamaguchi ........................ 395/200.54 |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

*Primary Examiner*—Mark H. Rinehart
*Assistant Examiner*—Marc D. Thompson
*Attorney, Agent, or Firm*—Workman, Nydegger, Seeley

[57] ABSTRACT

User computer software periodically queries a server for a compilation of information about the server and increases the frequency of the queries when the compilation indicates a deficiency at the server. Software monitoring messaging software on the server simulates the executions of a login procedure and a mail-reading procedure. A clock program used by the messaging software is monitored for accuracy and is updated if necessary.

40 Claims, 8 Drawing Sheets

FIG. 8

SYSTEM AND METHOD FOR MONITORING SERVER PERFORMANCE AT A CLIENT COMPUTER

BACKGROUND OF THE INVENTION

The invention is directed to monitoring the performance of a server and a network.

The server runs server software that includes one or more software modules, i.e., services. The server software is supported by operating system software that provides the server software with access to resources such as the server's computer hardware resources and the server's user interface resources. Typically, the operating status of an individual service may be determined by sending a query to the operating system. In response to the query, the operating system sends a reply that includes the operating status of the service. The reply indicates, among other things, whether the service is running. The query may be sent by a computer that gains access to the server across a computer data connection such as a network connection. To determine the status of multiple services at one server, the querying computer sends multiple queries and receives multiple replies. The queries and replies typically include at least one query and one reply per service.

The server software may be included in a messaging system that allows a user to direct a message from a source location, e.g., a messaging server, on the messaging system to a destination location, e.g., another messaging server, on the messaging system. Typically, each user of the messaging system is associated with a set of resources in the messaging system, i.e., has a messaging account. Each time the user initiates a messaging session for, e.g., reading and otherwise manipulating messages, the user is typically required to execute a "login" procedure. The login procedure provides the user with access to the user's messaging account after verifying that the user has permission to use the account. In the verification, the user is typically required to provide at least a proper password.

Each location in the messaging system typically makes use of a time indicator that is provided at the location, typically by the operating system. The time indicator is used by the location for purposes such as including a timestamp in an outgoing message, to indicate when the outgoing message was sent. Each location's time indicator operates independently of the time indicators of other locations and is adjusted independently as well.

SUMMARY OF THE INVENTION

A technique is provided wherein monitoring software is divided between a monitored server and a monitoring user computer, with the server portion of the software configured to reply, to a query from the monitoring user computer, with a compilation of information about the server and software services running on the server. Queries are sent periodically and are separated by a normal time interval or a shorter, critical time interval. The queries proceed according to an escalation procedure in which the monitoring user computer automatically switches to using the critical interval after a deficiency is discovered. In addition, the server portion of the software periodically determines whether a user of messaging software on the server is able to gain access to the user's messages. The outcome of this determination is preferably included in the reply to each query. A time indicator that is located at the server and that is used by the messaging software is monitored to determine the accuracy of the time indicator with respect to a master time indicator that is located at the monitoring user computer.

The invention has several advantages. Information about the server is sent in a single compilation, allowing the monitoring user computer to avoid having to send repeated queries to the server to gather necessary information from the server. Servers that are not connected to the network, i.e., are without power or are not running network connectivity software properly, can be detected. Subsequent to a discovery of a deficiency on the server, the frequency of providing information about the server is increased without intervention by an administrator. The user computer portion of the software can monitor multiple servers. The selection of the server's services to be monitored by the monitoring software is determined by the server portion of the monitoring software; thus, changing the selection of the services to be monitored on a server requires no change to the user computer portion of the monitoring software. The clocks of servers in a messaging system are synchronized so that message timestamps are meaningful within the messaging system. The use of network resources in the messaging system is optimized during monitoring by re-establishing a working connection in the system only after a detection of a deficiency in the connection.

In one aspect, the invention feature a method of monitoring a server computer, the method including compiling at the server computer a collection of information about the status of the server computer, the collection including a plurality of status indicators, sending a query to the server computer from a user computer, and sending a reply from the server computer to the user computer, the reply including the collection.

Implementations of this aspect of the invention may include one or more of the following features. The collection may include the status of a software service at the server. A messaging system, a facsimile communications system, or an Internet communications system may include the software service. The software service may include a directory service, a message store service, or a message transfer agent service.

The collection may include information about a deficiency at the server. The reply may include information directed to be included in the reply by a configuration setting at the server. The user computer may send a query to each of a plurality of servers and may receive a reply from each of the plurality of servers.

In another aspect, the invention features a method of monitoring a server computer, the method including sending a plurality of queries for information about the server computer, the queries being sent at an adjustable frequency, each query being sent to the server computer from a user computer, compiling the information in a reply to one of the queries, sending the reply from the server computer to the user computer and, based on the reply, adjusting the frequency of sending the queries.

Implementations of this aspect of the invention may include one or more of the following features. The reply may include information about a deficiency at the server computer and the frequency may be increased as a result of the deficiency. The reply may include the status of a software service at the server computer or information directed to be included in the reply by a configuration setting at the server computer.

The method may further include using a plurality of lists of server computers, wherein each list corresponds to a different frequency of sending queries. The method may further include determining from the reply whether a deficiency exists at the server computer and depending on the outcome of that determination, moving a list entry for the server computer, the list entry being moved from one of the lists of server computers to another of the lists of server computers. Moving the list entry may further depend on a configuration setting.

In yet another aspect, the invention features a method of monitoring a messaging system, the method including automatically attempting to establish a working connection to a mailbox in the messaging system, determining whether the working connection is established, and reporting the results of the attempt.

Implementations of this aspect of the invention may include one or more of the following features. Depending on the outcome of the determination, the method may further include automatically attempting to determine whether a message is available at the mailbox and may report the results of the attempt to determine whether a message is available. Depending on the outcome of the determination about whether a message is available, the method may further include attempting to read the message and reporting the results of the attempt to read the message.

In still another aspect, the invention features a method of monitoring a messaging system, the method including obtaining a time value from a time indicator associated with a server in the messaging system, comparing the time value with a master time value from a master time indicator, and based on the outcome of the comparison, updating the time indicator.

Implementations of this aspect of the invention may include the following feature. The time value may include a time zone indicator and the method may further include determining a difference between the time value and the master time value, the determination using the time zone indicator, and comparing the difference to a maximum difference drawn from a configuration setting.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
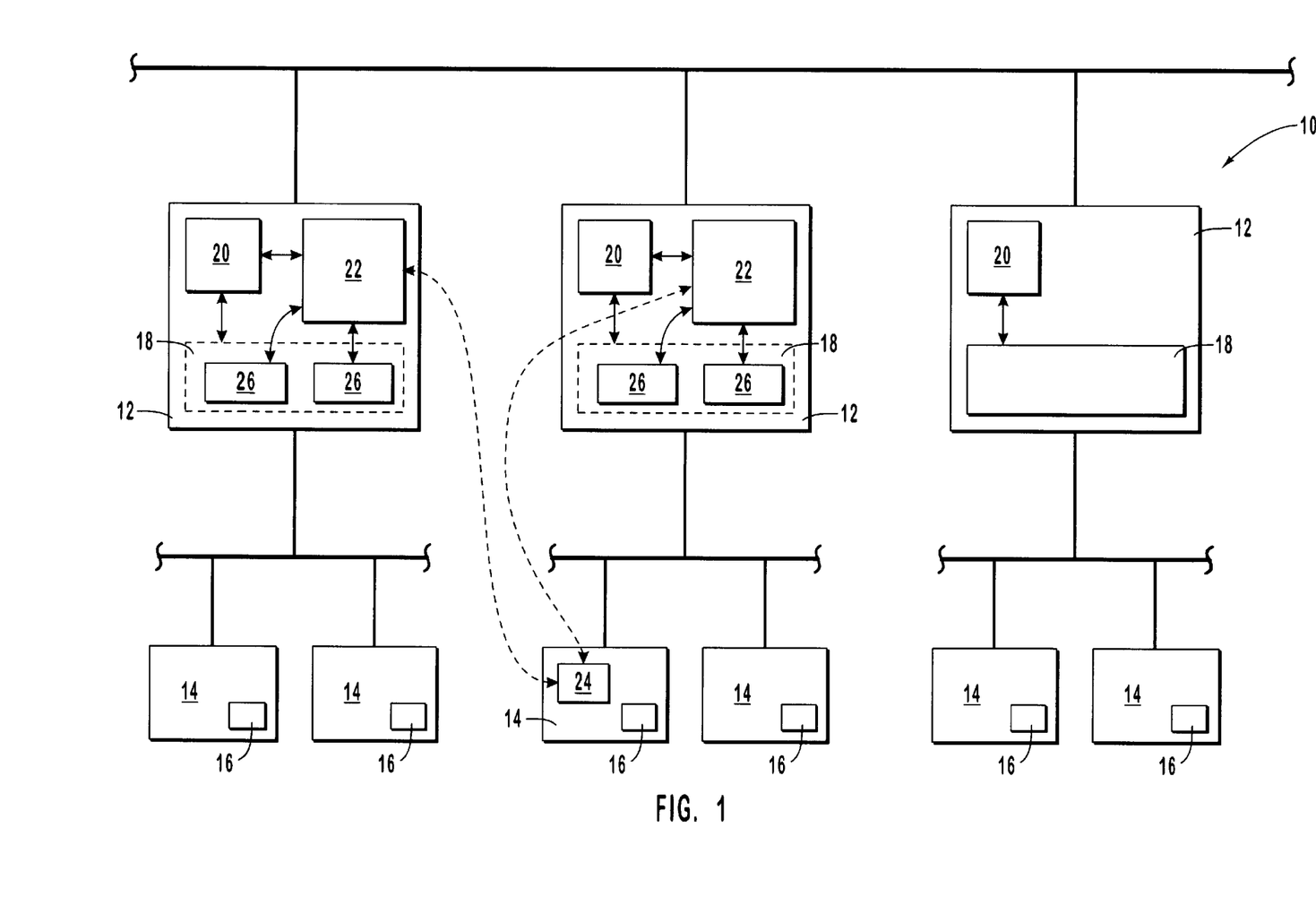
FIG. 1 is a block diagram of a messaging system.

FIG. 1 illustrates a messaging system 10 that includes messaging servers 12 and user computers 14 that are linked to form a networked computer system such as a client-server system. To use the messaging system, a user preferably employs user messaging software 16 running on a user computer. In combination with server messaging software 18 running on a server, the user software 16 allows the user to read messages stored at the user's mailbox at the server, create outgoing messages, and otherwise manipulate messages. For reasons such as minimizing the user software's use of the link with the server software, the user software 16 preferably establishes a working connection with the server software 18 only under certain circumstances. For example, the working connection is established when the user initiates a messaging session to manipulate messages. To initiate a messaging session, the user activates the user software and causes the user software to execute a login procedure. A password for the user is passed to the server software, which allows such a working connection to be established only if the server recognizes the password. After the login procedure is completed, the user is able to proceed with the messaging session. When the messaging session is over, the working connection is preferably broken by the user when the user de-activates the user software.

In addition, each server preferably provides a time indicator 20 that is used by the server software for one or more purposes such as adding a timestamp to outgoing messages created by the user.

Deficiencies in the messaging system are detected by a monitoring system that includes system attendant programs 22 that report to polling software 24. Each server that is monitored by the monitoring system runs such an attendant 22. The polling software preferably runs on a user computer and provides an administrator with access to the monitoring system. As described below, each attendant compiles information about the server on which the attendant runs and, when queried by the polling software, provides the compilation to the polling software. The compilation preferably includes at least information about services 26 of the server software 18, including, e.g., a directory service, a message store service, and a message transfer agent ("MTA") service. The directory service maintains records of locations of mailboxes in the messaging system and is used in the delivery of a message. The message store service stores and retrieves incoming messages for reading and other manipulation by users associated with the server. The MTA service consults the directory service to deliver messages in the messaging system.

The polling software preferably maintains two lists of server sites, i.e., two lists of system attendants, to query: a normal sites list and a critical sites list. The sites in the normal sites list are queried by the polling software in accordance with a "normal" polling interval, e.g., 15 minutes. The polling software uses a shorter, "critical" polling interval, e.g., 2 minutes, for the sites in the critical sites list. Initially, all of the sites monitored by the monitoring system are included in the normal sites list. As described below, a site may be transferred from the normal sites list to the critical sites list if a deficiency is discovered at the site.

In a polling procedure (FIG. 2) that is triggered in accordance with one of the polling intervals, the polling software first determines the sites to query. The polling software so determines by referring to the appropriate sites list. If the procedure was triggered in accordance with the critical polling interval (step 200), the polling software refers to the critical sites list (step 210). Otherwise, the polling software refers to the normal sites list (step 220). Preferably, the polling software then queries the attendant for each site listed in the sites list (step 230). The polling software so queries by sending a network message to each attendant. Each attendant is expected to reply to the query with information in a compilation that is described below. The information from each attendant includes status indicators that indicate whether deficiencies exist in the time indicator or software of the site corresponding to the attendant. If an attendant for a particular site does not respond with a compilation of information (step 240), the polling software determines that the attendant is not operating properly, which constitutes a deficiency.

Figure 2:
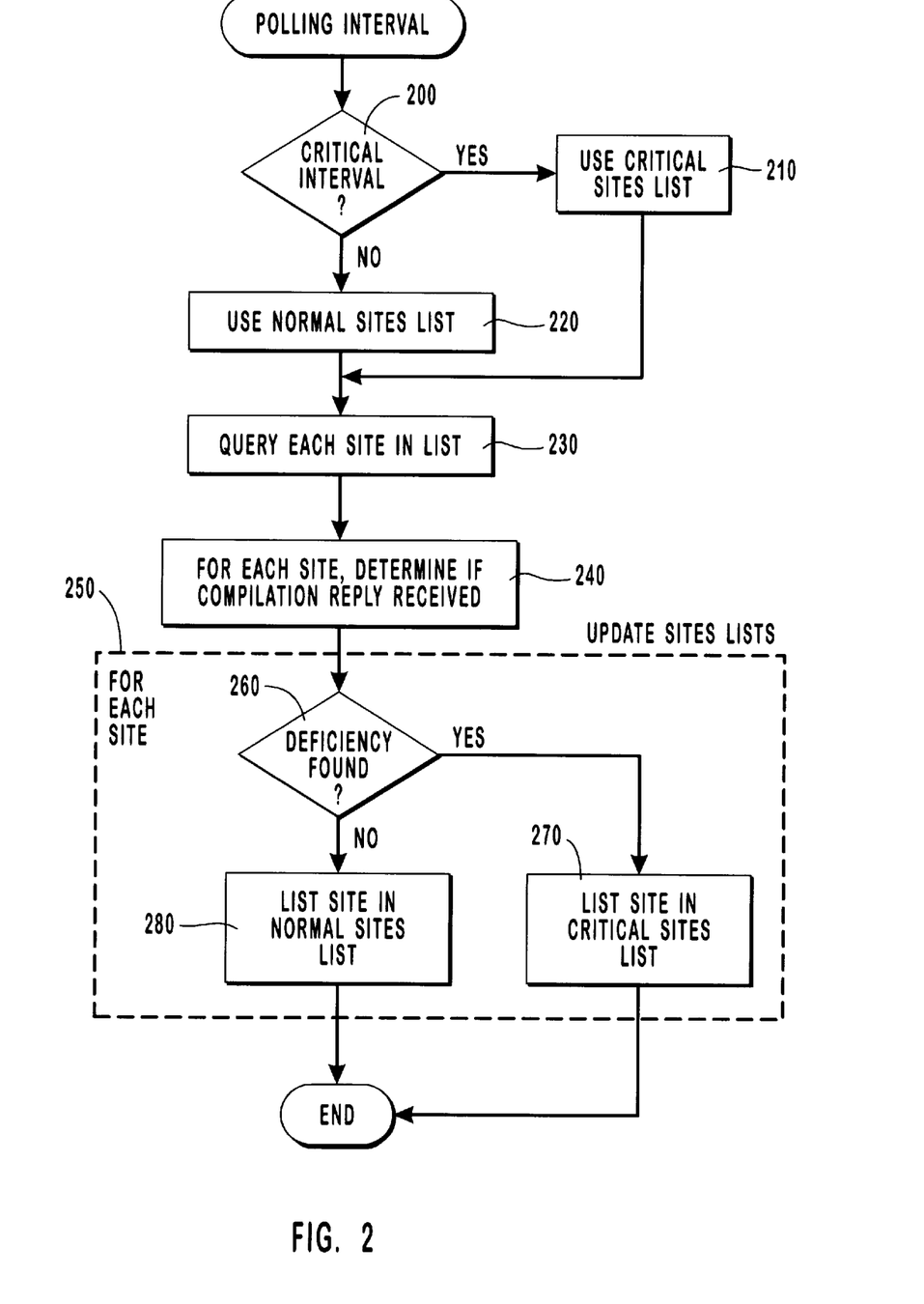
FIG. 2 is a flow chart of a procedure for polling servers for information.

The polling software then updates the sites lists, using the information about deficiencies, if any, and pre-selected configuration settings made by the administrator (step 250). The lists are preferably updated according to an escalation procedure. For example, for queries involving the normal sites list, the administrator may configure the polling software with list-transfer settings that are based on new deficiencies discovered (step 260). Such a list transfer setting may direct the polling software to transfer the list entry for a site to the critical sites list if the polling software discovers that the site's directory service is in a non-functioning state (step 270). Such a transfer is appropriate, because the server is unable to operate properly without a functioning directory service. Transferring the list entry for the site to the critical sites list after such a discovery allows the polling software to provide the administrator with information about the site at more frequent, e.g., 2-minute, intervals.

The administrator is also able to pre-select configuration settings for the polling software for queries involving the critical sites list. For example, according to a list-transfer setting, a list entry for a site may be transferred back to the normal sites list (step 280). Such a transfer may occur if all deficiencies reflected in earlier replies from the site's attendant are absent from the most recent reply from the attendant. In most cases, such a setting is appropriate, because, after all of a site's deficiencies have cleared, the administrator desires information at less frequent, e.g., 15-minute, intervals. A deficiency may clear in response to one or more actions taken by the administrator or by an automated mechanism or both.

At the site, the attendant preferably gathers some information autonomously and other information only after receiving a query from the polling software. However, preferably all of the information provided in response to the query, regardless of the way in which some of the information is gathered, is provided to the polling software in one compilation and is not provided piecemeal. For example, the attendant autonomously monitors a particular capability of the server messaging software. The capability involves allowing the reading of mail and making a working connection with a new instance of user messaging software, as described above. The attendant so monitors by simulating the executions of a mail-reading procedure and a login procedure. The simulation is accomplished by exercising the server messaging software in the same way that the server messaging software is exercised in the executions of actual mail-reading and login procedures.

Figure 3:
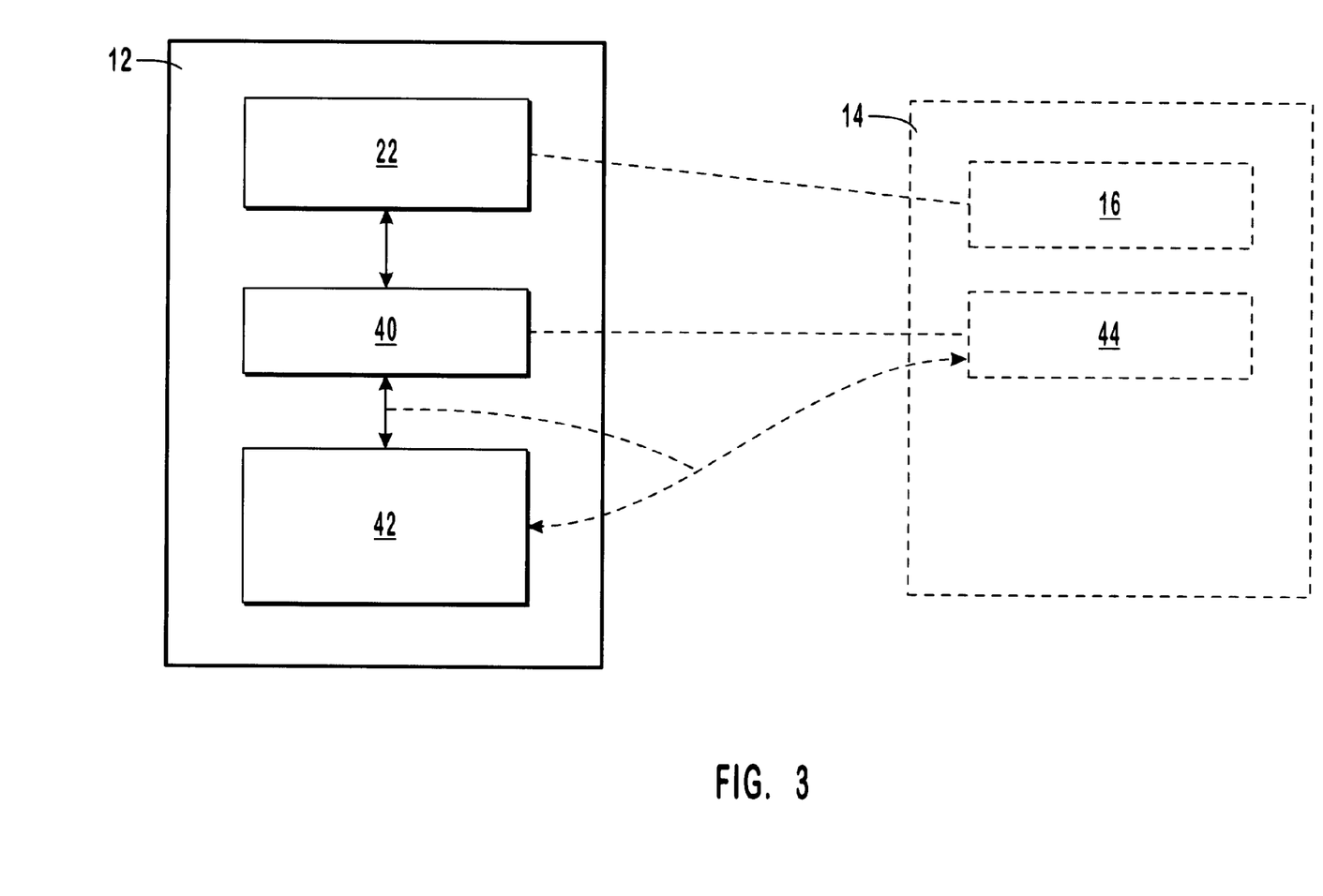
FIG. 3 is a block diagram of a server and a user computer in a messaging system.

The server messaging software is exercised as follows (FIG. 3). The system attendant 22 has a messaging account, i.e., the attendant account, that is created when the attendant is first located and started at the server 12. The use of the attendant account differs from the use of the messaging account of an ordinary user of the server in that the attendant does not send a password to gain access to the attendant account. Instead, the attendant gains access by submitting security codes retrieved from a network source that is responsible for network security. In other regards, the attendant account is preferably identical, aside from its contents and the like, to an ordinary user's account.

At the time the attendant account is created, a message store buffer service 40 is also located and started at the server. Through the buffer service, the attendant gains access to the server software's message store service 42. The buffer service 40 is preferably identical to a user buffer service 44 that, in the case of an actual user, runs on the user's user computer 14 along with the user messaging software 16. With respect to an actual user, the user buffer service 44 minimizes the user software's use of the link between the user software and server software by buffering information from the message store service. For example, when the message store service 42 receives a new message directed to the user running the user software, the message store service sends a new-mail indication to the user buffer service. Thus, when the user software is ready to determine whether the user has one or more new messages, the user software is able to make the determination by referring to the user buffer service, not to the message store directly.

Figure 4:
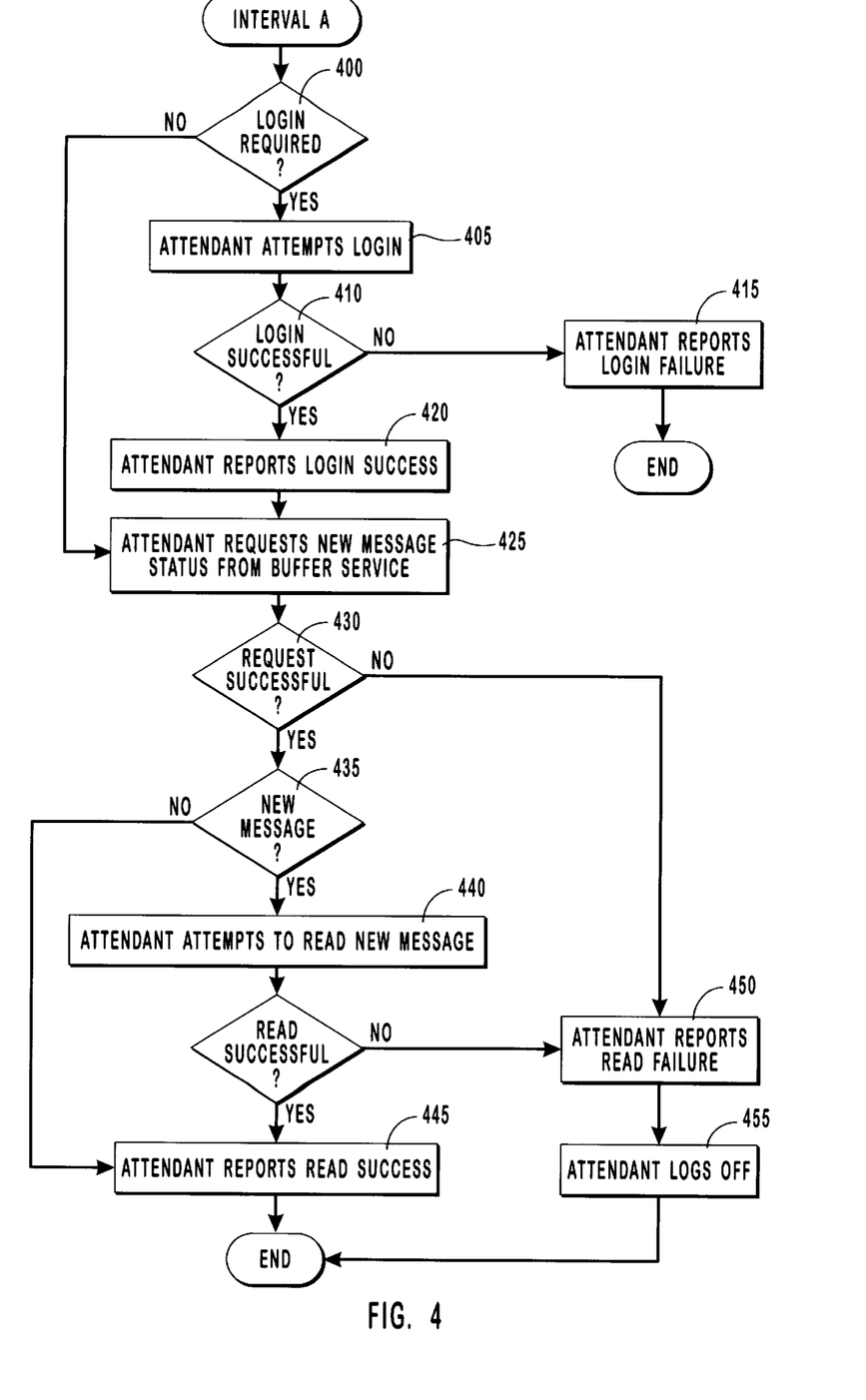
FIG. 4 is a flow chart of a procedure for testing the mail-reading and login execution capabilities of a messaging server.

The attendant tests the use of the buffer service by executing, at periodic intervals "A" of preferably one minute each, an interval A function (FIG. 4). First, the attendant determines whether it is necessary for the attendant to execute a login procedure to establish a working connection with the server software (step 400). If so, a login procedure is attempted (step 405). In the login procedure, the server software restarts services and establishes a working connection with the attendant. If the login procedure fails (410), the attendant reports a login failure (step 415) for the next compilation reply, as described below, and terminates the execution of the interval A function. On the other hand, if the login procedure is successful, the attendant reports a login success (step 420) and the execution of the interval A function continues.

A working connection having been established during this or a previous instance of executing an interval A function, the attendant then requests the buffer service to indicate whether any new messages have arrived for the attendant (step 425). If the buffer service responds properly to the request (step 430), the attendant then determines whether the buffer service's response indicates that the attendant has a new message (step 435). If the response so indicates, the attendant then attempts to read the new message (step 440). A successful read attempt or a lack of a new message to read causes the attendant to finish the interval A function with a successful report (step 445).

However, if the attendant does not receive a proper response from the buffer service or if the read attempt is unsuccessful, the attendant reports failure (step 450) and then executes a logoff procedure (455). In the logoff procedure, the attendant terminates the working connection with the server software. The logoff procedure is executed to set up the attendant to attempt to execute a login procedure at the start of the next execution of an interval A function. The logoff-login sequence is used to (1) attempt to address the cause of the failure, by causing, as described above, services to restart in the login procedure, and (2) test the ability of the server software to accept the execution of a login procedure.

In the case of an actual user and user computer, the buffer service rarely requests information from the message store service. Rather, the buffer service simply waits for the message store service to provide information. However, the buffer service includes a facility that is triggered when the buffer service has not received information from the message store service for a long time, e.g., one hour, while a working connection exists. The facility is triggered to confirm that the lack of received information is not due to a problem in communications between the buffer service and the message store service. The facility updates the buffer service's buffer of information by causing the buffer service to renew the buffer service's connection with the message store service and to request information from the message store service.

The attendant uses the facility at intervals "B", preferably every five minutes. The use of the facility at every five minutes allows the attendant to detect a communications problem quickly, i.e., within much less than the facility's standard one-hour interval. In the interval B function (FIG. 5), the attendant is able to use the facility only if the attendant has a working connection to the server software, i.e., if the attendant is "logged in" (step 500). The attendant invokes the facility (step 510) and then determines whether the invocation was successful (step 520). The invocation is expected to be successful unless the buffer service has developed a problem.

Figure 5:
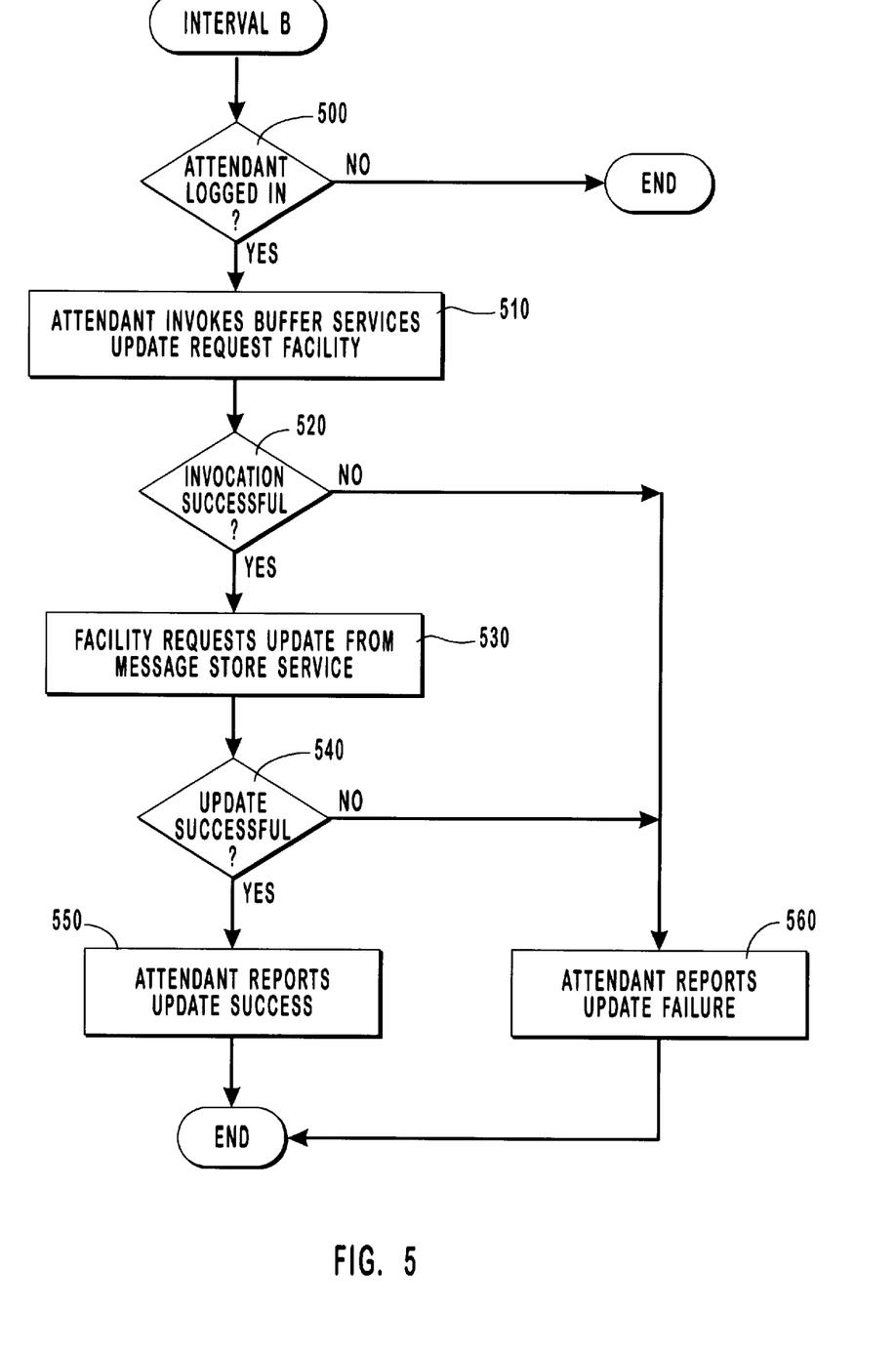
FIG. 5 is a flow chart of a procedure for testing the buffer-service-updating capability of a messaging server.

If successfully invoked, the facility then requests an update, as described above, from the message store service (step 530). If the update proceeds successfully (step 540), the success is reported for the next compilation reply (step 550). However, if either the invocation or the update request is unsuccessful, the attendant reports failure for the interval B function (560).

Figure 6:
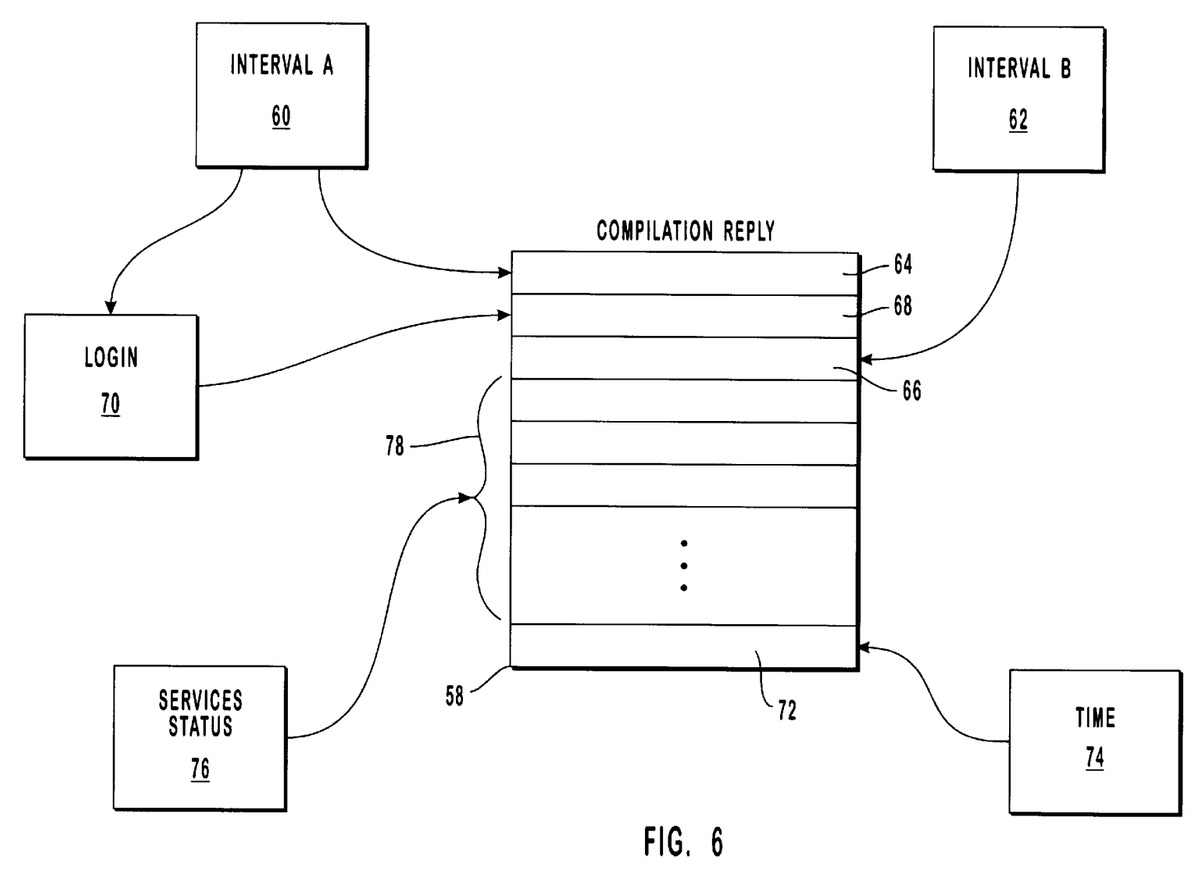
FIG. 6 is a block diagram of a construction of a compilation reply.

The reports of the interval A and interval B function are included in the compilation reply that is sent to the polling software after the attendant receives a query from the polling software. FIG. 6 illustrates the construction of the compilation reply 58. The interval A and interval B functions 60, 62 contribute reports 64, 66 about the attendant's latest attempts to read mail and update the buffer service. In addition, a report 68 about the attendant's login-related capability is included from the login test 70 that is driven via the interval A function. The compilation reply also includes a time value 72 from the server's time indicator 74.

Figure 7:
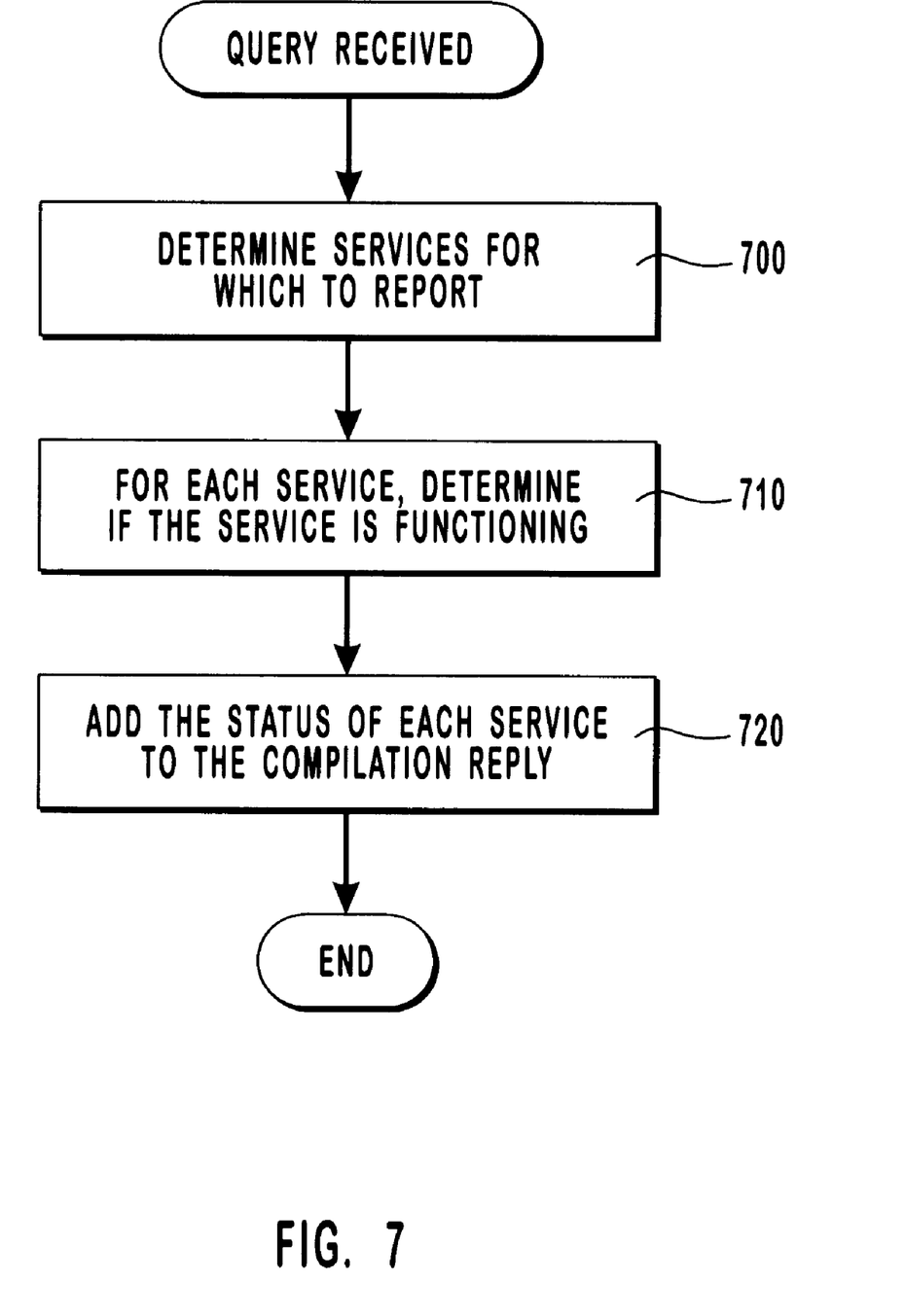
FIG. 7 is a flow chart of a procedure for including the status of a software service in a compilation reply.

The reply further includes, from a service-status function 76 of the attendant, a set 78 of reports that includes the status of each of various services running on the server. To include each status in the reply, the attendant first determines the services for which a status should be reported (FIG. 7, step 700). The attendant so determines by referring to a services list that includes services that were pre-selected by the administrator for the particular server. The server's services list preferably includes server messaging software services such as, as noted above, the directory service, the message store service, and the MTA service. Depending on the services available on a particular server, the administrator can configure the server's services list to include other services as well. Examples of these other services are (1) a service that is involved with communicating messages and computer data across the Internet and (2) a facsimile communications service.

The attendant then determines, for each service in the service list, whether the service is functioning properly (step 710). To do so, the attendant preferably invokes a facility of the operating system that reports whether the service is functioning properly. The report of the facility serves as the basis of the status determined for the service.

Finally, for each service in the services list, the attendant adds the status of the service to the reply (step 720).

Figure 8:
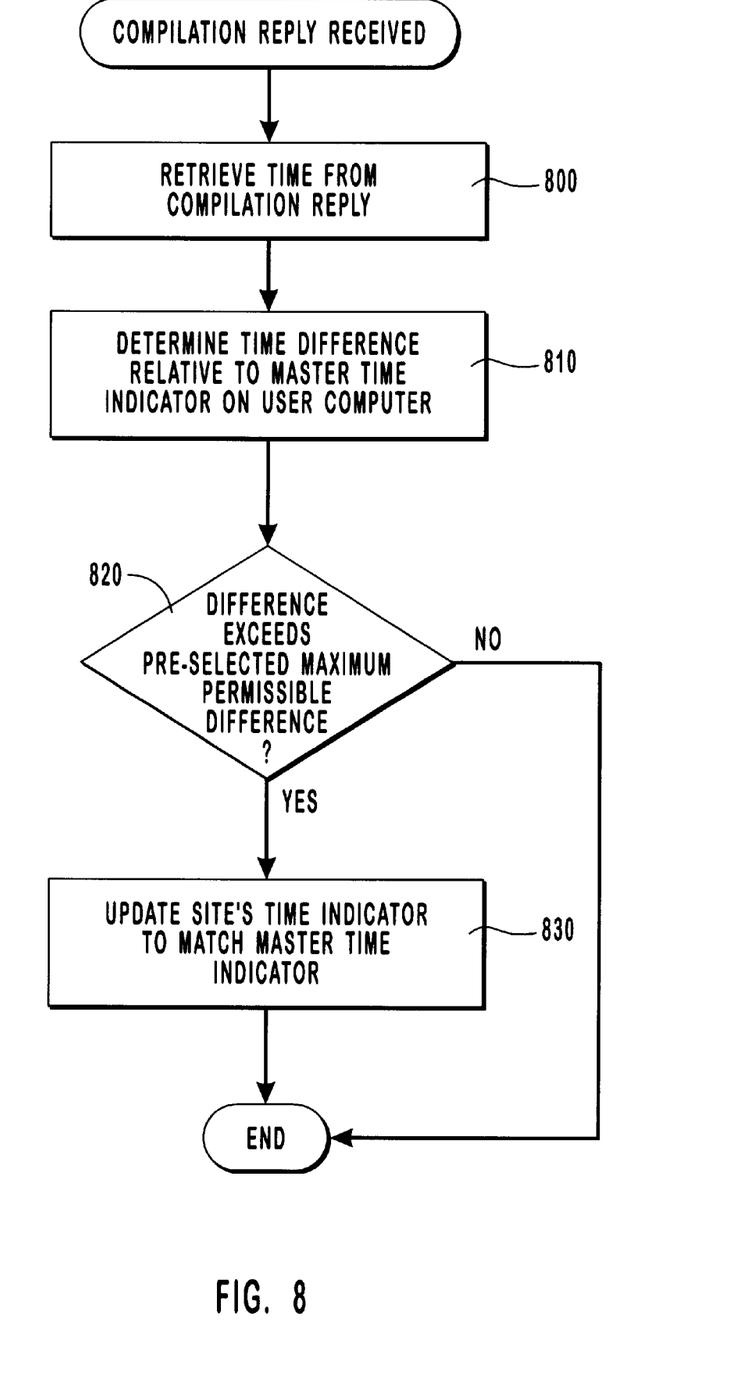
FIG. 8 is a flow chart of a procedure for synchronizing a server time indicator and a master time indicator.

When the polling software receives a compilation reply from a server, the software updates the server's clock if necessary (FIG. 8). To do so, the software first retrieves the server's time from the reply (step 800). The time includes a time zone indicator. The server's time is adjusted with respect to time zone and then compared to a master time kept by a master time indicator at the polling software's user computer (step 810). The difference in the times is then compared to a maximum permissible difference that is pre-selected by the administrator (step 820). If the maximum permissible difference is exceeded, the polling software then causes the server's time indicator to be updated to match the user's computer's master time indicator (step 830). By updating each server's clock as just described, the polling software is able to synchronize the clocks of all of the messaging system's servers that share the polling software.

Other embodiments are within the scope of the following claims. For example, the attendant may be used to detect not only deficiencies on the server but also usage of software on the server. Furthermore, the attendant may simulate not only a login procedure and a mail-reading procedure, but also other uses of the server, including shared-file access. In addition, various combinations of polling intervals may be used in the escalation procedure, including three or more polling intervals or polling intervals using progressively-increasing frequencies or polling intervals that are determined by reference to a prioritized list of deficiencies.

What is claimed is:

1. In a networked computer system that includes a plurality of server computers each running a plurality of network services, and a plurality of user computers that can be logically connected to any of the server computers to access the network services provided, a method of monitoring at one or more of the user computers the performance of the server computers, while reducing the need to send repeated queries from the user computers that perform such monitoring, the method comprising the steps of:

installing at one or more of the user computers polling software for sending queries to one or more of the server computers that are to be monitored;

installing at the server computers monitoring system software that includes system attendant programs for reporting information in response to the queries received from the polling software of one of said user computers;

sending a query from the polling software of a user computer to the monitoring system software of one or more server computers, said query requesting information about the proper functioning of the one or more queried server computers or about the proper functioning of one or more of the network services provided by the one or more queried server computers;

said monitoring system software autonomously gathering at least a part of the information to be reported, in the sense of being independent of a specific query from any polling software of a user computer, and gathering the rest of the information to be reported in response to a specific query from a user computer's polling software;

regardless of the whether the information gathered by the monitoring system software is gathered autonomously or in response to a specific query, compiling the gathered information into a single compilation prior to sending it back to the user computer's polling software; and the polling software at the user computer which from which the query was sent then receiving and using the returned compilation to update one or more site lists about the status of the proper functioning of the one or more queried server computers or about the status of the proper functioning of one or more of the network services provided by the one or more queried server computers.

2. The method of claim 1, wherein the compilation comprises the status of a software service at a queried server computer.

3. The method of claim 2, wherein a messaging system comprises the software service.

4. The method of claim 2, wherein the software service comprises a directory service.

5. The method of claim 2, wherein the software service comprises a message store service.

6. The method of claim 2, wherein the software service comprises a message transfer agent service.

7. The method of claim 2, wherein a facsimile communications system comprises the software service.

8. The method of claim 2, wherein an Internet communications system comprises the software service.

9. The method of claim 1, wherein the compilation comprises information directed to be included in the compilation by a configuration setting at a queried server computer.

10. The method of claim 1 wherein said one or more network services comprises a messaging system, and wherein the method is further comprised of the steps of:

automatically attempting to establish a working connection to a mailbox in the messaging system;

determining whether the working connection is established; and reporting the results of the attempt in said compilation.

11. The method of claim 10, wherein the method further comprises:

depending on the outcome of the determination, automatically attempting to determine whether a message is available at the mailbox; and depending on the outcome of the determination about whether the working connection is established, reporting in said compilation the results of the attempt to determine whether a message is available.

12. The method of claim 11, wherein the method further comprises:

depending on the outcome of the determination about whether a message is available, attempting to read the message; and depending on the outcome of the determination about whether a message is available, report in said compilation the results of the attempt to read the message.

13. The method of claim 10, wherein establishing a working connection to the mailbox is dependent on the messaging system's acceptance of a security code.

14. The method of claim 10, wherein attempting to establish a working connection is driven by a detection of a failure in the messaging system.

15. The method of claim 10, wherein the method further comprises exercising a software service used in the establishment of a user's working connection.

16. The method of claim 15, wherein the software service comprises a buffer service.

17. The method of claim 1 wherein said step of updating the one or more site lists is performed according to an escalation procedure to use a critical reporting interval.

18. The method of claim 17 wherein said escalation procedure is established by having a system administrator configure the polling software with list-transfer settings that are based on new deficiencies discovered in said returned compilation, so that any server computer with a newly discovered deficiency in its proper functioning or in the proper functioning of any of the network services provided by it is then transferred from a normal sites list to a critical sites list.

19. The method of claim 18 further comprising the step of said polling software providing to a system administrator information about sites contained on said critical sites list more frequently than for the normal sites list.

20. The method as defined in claim 1 or 17 wherein said monitoring system software of each server computer is programmed to monitor a time indicator at the server computer, and wherein said method further comprises the step of returning a time indication based at the server computer with the compilation of information returned in response to a query from a user computer's polling software.

21. The method as defined in claim 20 wherein the polling software at said at least one user computer is programmed to monitor a master time indicator at the user computer, and wherein the method further comprises the step of comparing the time indication returned from a server computer with the time indicated at the master time indicator of the user computer, and if the returned time indication exceeds a maximum permissible difference selected by a system administrator, the polling software at the user computer causing the time indicator at the server computer's time indicator to be updated to match the user computer's time at the master time indicator, thereby permitting the polling software to synchronize the time indicators of all server computers.

22. As an article of manufacture, a computer program product for use in a networked computer system that includes a plurality of server computers each running a plurality of network services, each server computer having installed thereon monitoring system software that includes system attendant programs for reporting information in response to queries received from polling software installed at of one or more user computers that can be logically connected to any of the server computers to access the network services provided, the article of manufacture comprising one or more computer readable media for carrying executable instructions by which said networked computer system is caused to implement a method of monitoring at one or more of the user computers the performance of the server computers, while reducing the need to send repeated queries from the user computers that perform such monitoring, the implemented method of the executable instructions comprising the steps of:

sending a query from the polling software of a user computer to the monitoring system software of one or more server computers, said query requesting information about the proper functioning of the one or more queried server computers or about the proper functioning of one or more of the network services provided by the one or more queried server computers;

said monitoring system software gathering at least a part of the reported information autonomously in the sense of being independent of a specific query from any polling software of a user computer, and gathering the rest of the reported information specifically in response to a specific query from a user computer's polling software;

regardless of the whether the information gathered by the monitoring system software is gathered autonomously or response to a specific query, compiling the gathered information into a single compilation prior to sending it back to the user computer's polling software; and the polling software at the user computer which from which the query was sent then receiving and using the returned compilation to update one or more site lists about the status of the proper functioning of the one or more queried server computers or about the status of the proper functioning of one or more of the network services provided by the one or more queried server computers.

23. The computer program product of claim 22, wherein the compilation comprises the status of a software service at a queried server computer.

24. The computer software of claim 23, wherein a messaging system comprises the software service.

25. The computer software of claim 23, wherein the software service comprises a directory service.

26. The computer software of claim 23, wherein the software service comprises a message store service.

27. The computer software of claim 23, wherein the software service comprises a message transfer agent service.

28. The computer software of claim 23, wherein a facsimile communications system comprises the software service.

29. The computer software of claim 23, wherein an Internet communications system comprises the software service.

30. The computer program product of claim 22, wherein the compilation comprises information directed to be included in the compilation by a configuration setting at a queried server computer.

31. The computer program product of claim 22 wherein the implemented method of the computer executable instructions further comprises the steps of:

automatically attempting to establish a working connection to a mailbox in the messaging system;

determining whether the working connection is established; and reporting the results of the attempt.

32. The computer program product of claim 31, wherein the implemented method of the computer executable instructions further comprises the steps of:

depending on the outcome of the determination, automatically attempting to determine whether a message is available at the mailbox; and depending on the outcome of the determination about whether the working connection is established, reporting the results of the attempt to determine whether a message is available.

33. The computer program product of claim 32, wherein the implemented method of the computer executable instructions further comprises the steps of:

depending on the outcome of the determination about whether a message is available, attempting to read the message; and depending on the outcome of the determination about whether a message is available, reporting the results of the attempt to read the message.

34. The computer program product of claim 31, wherein the step of establishing a working connection to the mailbox is dependent on the messaging systems acceptance of a security code.

35. The computer program product of claim 31, wherein the step of attempting to establish a working connection is driven by a detection of a failure in the messaging system.

36. The computer program product of claim 22 wherein said step of updating the one or more site lists is performed according to an escalation procedure to use a critical reporting interval.

37. The computer program product of claim 36 wherein said polling software is configured by a system administrator with list-transfer settings, and wherein the method implemented by said computer executable instructions further comprises the step of whenever new deficiencies are discovered in said returned compilation which indicate that any server computer has a newly discovered deficiency in its proper functioning or in the proper functioning of any of the network services provided by it, then transferring that server computer from a normal sites list to a critical sites list.

38. The computer program product of claim 37 further comprising the step of said polling software providing to a system administrator information about sites contained on said critical sites list more frequently than for the normal sites list.

39. The computer program product as defined in claim 22 or 36 wherein said monitoring system software of each server computer is programmed to monitor a time indicator at the server computer, and wherein said method further comprises the step of returning a time indication based at the server computer with the compilation of information returned in response to a query from a user computer's polling software.

40. The computer program product as defined in claim 39 wherein the polling software at said at least one user computer is programmed to monitor a master time indicator at the user computer, and wherein the method further comprises the step of comparing the time indication returned from a server computer with the time indicated at the master time indicator of the user computer, and if the returned time indication exceeds a maximum permissible difference selected by a system administrator, the polling software at the user computer causing the time indicator at the server computer's time indicator to be updated to match the user computer's time at the master time indicator, thereby permitting the polling software to synchronize the time indicators of all server computers.

* * * * *

UNITED STATES PATENT AND TRADEMARK OFFICE
CERTIFICATE OF CORRECTION

PATENT NO. : 5,938,729`

DATED : August 17, 1999

INVENTOR(S) : Joseph Paul-Emile Pierre Cote,

Stephen David Thomas

It is certified that error appears in the above-identified patent and that said Letters Patent is hereby corrected as shown below:

Cover page, second column, after "Attorney, Agent, or Firm" change "Workman, Nydegger, Seeley" to --Workman, Nydegger & Seeley--

Col. 2, line 23, after "invention" change "feature" to --features--

Col. 6, line 33, after "runs on the" delete "user's"

Col. 9, line 20, after "computer" delete "which"

Col. 11, line 20, before "response" insert --in--

Signed and Sealed this

Eighth Day of August, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,938,729
DATED : August 17, 1999
INVENTOR(S) : Joseph Paul-Emile Pierre Cote, Stephen David Thomas It is certified that error appears in the above-identified patent and that said Letters Patent is hereby corrected as shown below:

Title page,
After "Attorney, Agent, or Firm" change "Workman, Nydegger, Seeley" to -- Workman, Nydegger & Seeley --

Column 2,
Line 23, after "invention" change "feature" to -- features --

Column 6,
Line 33, after "runs on the" delete "user's"

Column 9,
Line 20, after "computer" delete "which"

Column 11,
Line 20, before "response" insert -- in --

Signed and Sealed this

First Day of January, 2002

Attest:

Attesting Officer

JAMES E. ROGAN
Director of the United States Patent and Trademark Office